(12) United States Patent
Adams et al.

(10) Patent No.: US 6,657,217 B2
(45) Date of Patent: Dec. 2, 2003

(54) PROBE FOR SENSING MOVEMENT IN A COMPRESSOR SYSTEM

(75) Inventors: Mark A. Adams, York, PA (US); Dean K. Norbeck, York, PA (US); Paul W. Snell, York, PA (US); Alexander J. Soussa, York, PA (US)

(73) Assignee: York International Corporation, York, PA (US)

( * ) Notice: Subject to any disclaimer, the term of this patent is extended or adjusted under 35 U.S.C. 154(b) by 159 days.

(21) Appl. No.: 09/828,934

(22) Filed: Apr. 10, 2001

(65) Prior Publication Data

US 2002/0145120 A1 Oct. 10, 2002

(51) Int. Cl.[7] .......................... G01N 21/86; G01V 8/00; F01C 21/00; F03C 2/00; F16N 13/20
(52) U.S. Cl. ...................... 250/559.26; 250/559.27; 418/2
(58) Field of Search .................. 250/559.26, 559.27, 250/231.1, 231.19, 559.24, 221; 418/2

(56) References Cited

U.S. PATENT DOCUMENTS

| | | | |
|---|---|---|---|
| 2,684,568 A | 7/1954 | Senger | |
| 2,839,071 A | 6/1958 | Rosch | |
| 3,002,374 A | 10/1961 | Jacobs | |
| 3,220,244 A | 11/1965 | Donnelly | |
| 3,754,433 A | 8/1973 | Hyer | |
| 3,849,893 A | 11/1974 | Ormsby | |
| 3,861,818 A | 1/1975 | Eggenberger | |
| 3,910,729 A | 10/1975 | Jepsen et al. | |
| 3,932,941 A | 1/1976 | Ormsby | |
| 4,180,329 A | 12/1979 | Hildebrand | |
| 4,326,804 A | 4/1982 | Mossey | |
| 4,384,819 A | 5/1983 | Baker | |
| 4,389,891 A | 6/1983 | Fournier | |
| 4,413,946 A | 11/1983 | Marshall et al. | |
| 4,523,451 A | 6/1985 | Boster | |
| 4,561,776 A | 12/1985 | Pryor | |
| 4,596,460 A | 6/1986 | Davinson | |
| 4,632,635 A | 12/1986 | Thoman et al. | |
| 4,762,461 A | 8/1988 | Ushikoshi | |
| 4,971,517 A | 11/1990 | Perkey et al. | |
| 5,067,349 A | 11/1991 | Hirchert | |
| 5,275,054 A | 1/1994 | Park | |
| 5,315,877 A | 5/1994 | Park et al. | |
| 5,349,865 A | 9/1994 | Kavli et al. | |
| 5,656,780 A | 8/1997 | Park | |
| 5,814,724 A | 9/1998 | Romkee | |
| 5,879,146 A * | 3/1999 | Van De Voort et al. | 418/2 |
| 5,929,754 A | 7/1999 | Park et al. | |
| 5,975,842 A | 11/1999 | Jensen et al. | |
| 6,036,432 A | 3/2000 | Sishtla et al. | |
| 6,168,385 B1 * | 1/2001 | Clamp | 418/2 |

* cited by examiner

Primary Examiner—Ricky Mack
Assistant Examiner—Alicia M. Harrington
(74) Attorney, Agent, or Firm—Brian T. Sattizahn; McNees Wallace & Nurick LLC

(57) ABSTRACT

A probe is used to detect axial movement of a rotating part such as a shaft. The probe includes a probe tube portion that protrudes into an annular groove on the rotating part. When the rotating part moves axially, one or the other side surfaces of the groove contacts the probe tube. This contact leads to a changed state of the probe, that is sensed by a sensor.

26 Claims, 11 Drawing Sheets

PROBE FOR SENSING MOVEMENT IN A COMPRESSOR SYSTEM

DESCRIPTION OF THE INVENTION

1. Field of the Invention

This invention is directed to sensors for detecting when moving parts within a system are about to violate clearance dimensions.

2. Background of the Invention

Equipment that contains rotating or other moving parts can be damaged if sufficient clearance dimensions are not maintained. Costly damage may be avoided if the equipment or system is shut down before the parts exceed a certain tolerance. Different types of proximity probes have been developed to warn system operators of parts nearing maximum dimension tolerances, thus allowing the system operator to shut the equipment down before it is damaged or creates a safety hazard. However these proximity probes have several limitations.

Axial sensors are often used to sense the position of the internal rotating parts relative to the stationary housing or casing of the machine. Axial sensors are placed axially in relation to the rotating part. It may not be possible to fit axial sensors into a given machine due to insufficient axial space. Additionally, axially positioned sensors can only sense movement in one direction. In order to sense movement in both axial directions, more than one axial sensor is required. In certain circumstances a probe positioned in a non-axial position may serve the purpose of an axial sensor, and a single probe may sense axial movement in both axial directions.

Some proximity probes sense position and output a signal proportional to the distance between two components. The signal is generated by changes in optics or some other technique. The signal can be interpreted by electronic circuitry or digital computational devices to shut down a system before it is damaged. While these type of probes may provide detailed information on the location of moving parts, they are expensive. Additionally, they are subject to electronic noise and may occasionally give a false reading. When used in compressors in refrigeration systems, the sensor portion cannot be replaced without removing the system refrigerant charge and equalizing pressures of the system and the ambient conditions.

Thus, there is a need for an improved position limit sensor, particularly in pressurized applications.

SUMMARY OF THE INVENTION

To achieve the advantages and in accordance with the purpose of the invention, as embodied and broadly described herein, the invention includes a position sensor system to detect movement of a rotating part including a probe positioned non-axially from the rotation part, a surface on the rotating part for contacting the probe when the part moves a pre-selected distance and a sensor associated with the probe wherein when the rotating part contacts the probe, and the sensor generates a control signal.

In another aspect, the advantages of the invention are achieved and the purpose thereof is served by a method of detecting the movement of a part in a system or device including positioning a probe non-axially and adjacent to but spaced from a surface of the moving part, providing a sensor in association with the probe, and generating a signal from the sensor when the probe and the moving part contact each other.

Additional objects and advantages of the invention will be set forth in part in the description which follows, and in part will be obvious from the description, or may be learned by practice of the invention. The objects and advantages of the invention will be realized and attained by means of the elements and combinations particularly a pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate embodiments of the invention and together with the description, serve to explain the principles of the invention.

DESCRIPTION OF THE EMBODIMENTS

Reference will now be made in detail to exemplary embodiments of the invention, examples of which are illustrated in the accompanying drawings. Wherever possible, the same reference numbers will be used throughout the drawings to refer to the same or like parts.

Figure 3:
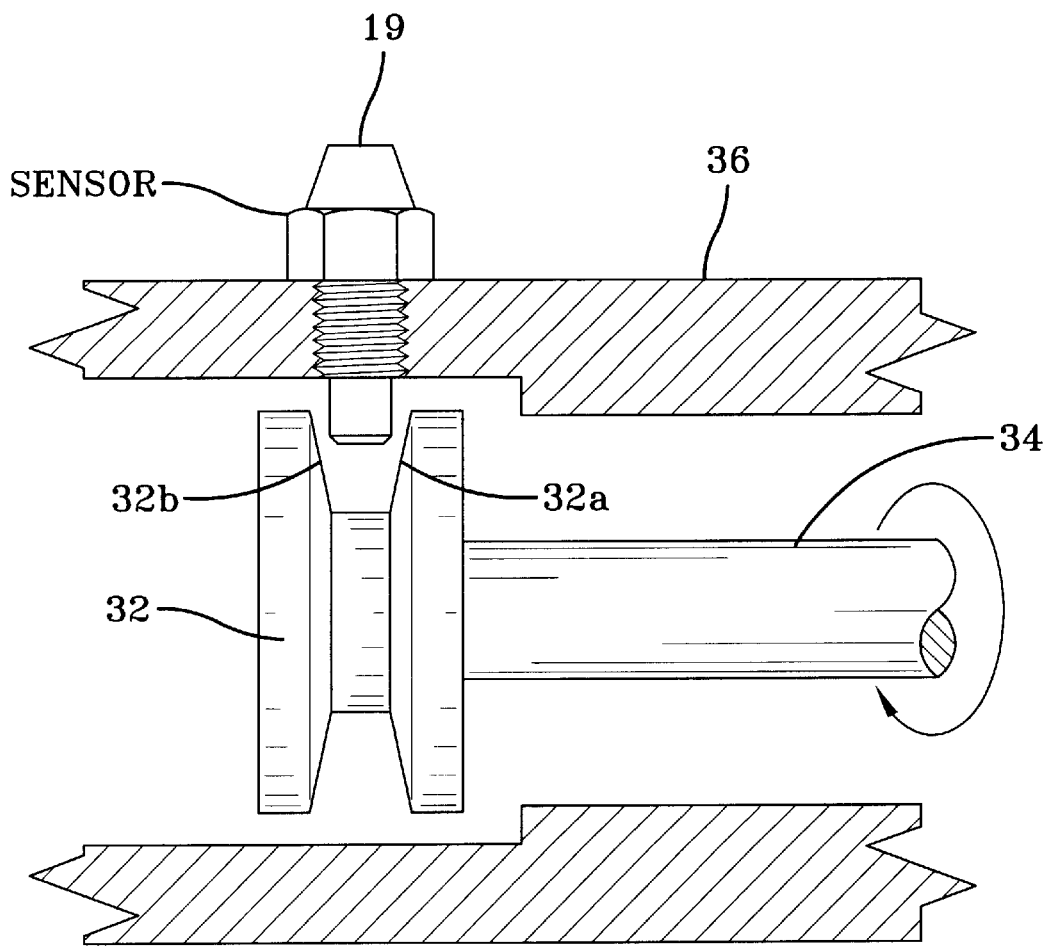
FIG. 3 is a side view of a probe positioned radially to a rotating shaft.
Figure 9A:
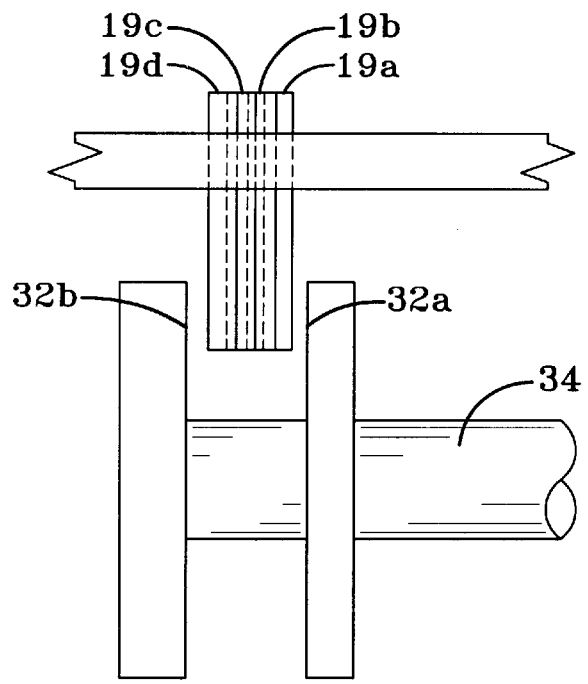
FIGS. 9a and 9b are front and side views of a series of position sensors positioned to contact a moving part one at a time.
Figure 9B:
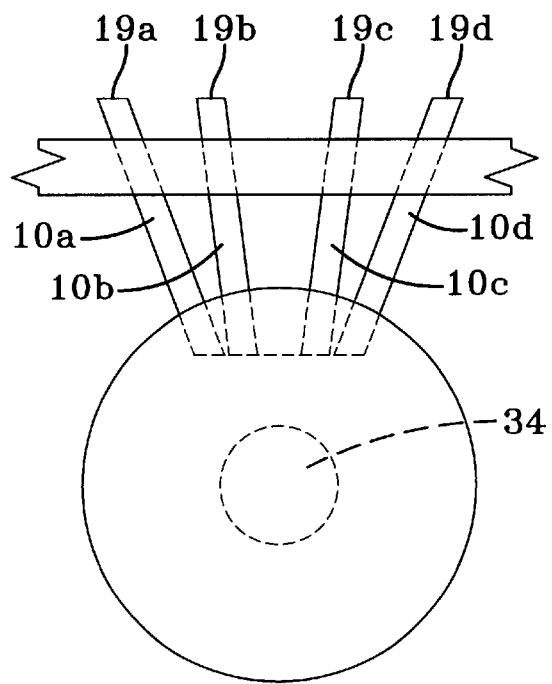

The invention is particularly useful for detecting axial movement of a rotating shaft. As shown in FIG. 3, the probe 19 is positioned radially from the axis of the rotating shaft 34. Although FIG. 3 shows the probe 19 as positioned radially, in other uses or embodiments of the invention, the probe 19 does not have to be positioned exactly radially to a rotating part to be in accordance with the invention. The probe 19 may be canted at various angles, as shown in FIG. 9b in a non-axial position. A portion of the shaft 32 has an annular groove which creates a lip 32a. The grooved portion of the shaft 32 may be of a different diameter than the rest of the shaft as shown in FIG. 3 or it may be the same diameter as the rest of the shaft 34 (not shown). In a preferred embodiment, the groove is formed in a thrust collar 32 attached to the shaft 34 as in FIG. 1. In other embodiments of the invention, a raised surface (not shown) can be formed or fixed to the shaft, to create a lip or ledge protruding outwardly from the surface of the shaft 34.

Figure 2:
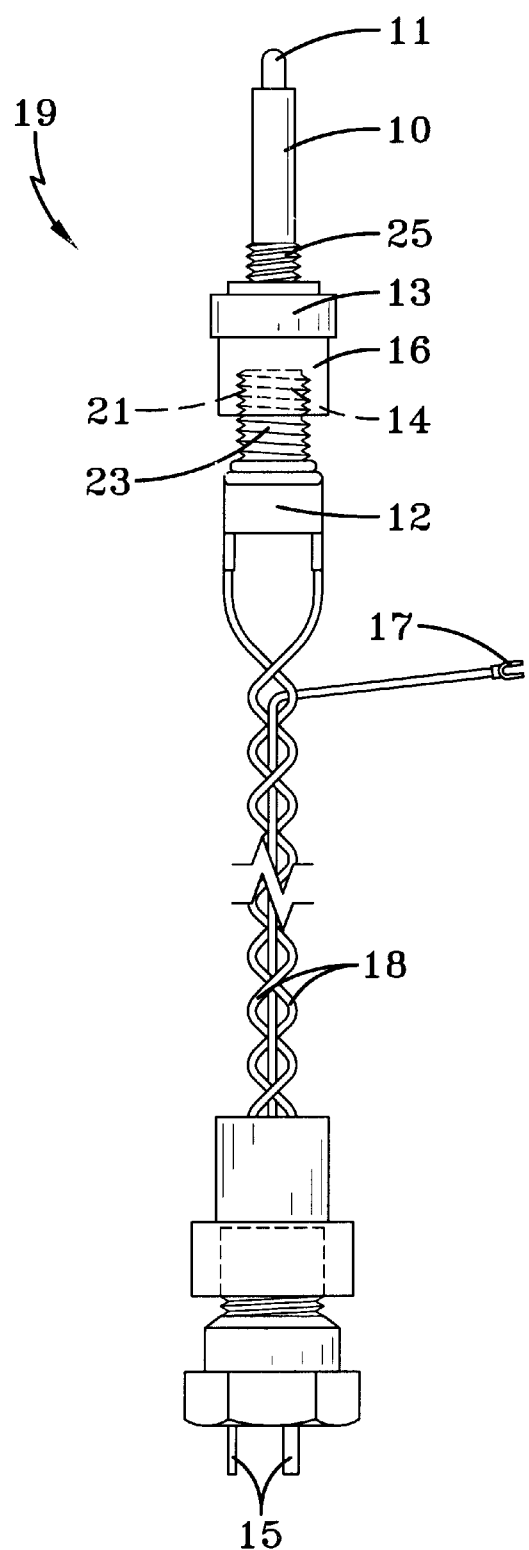
FIG. 2 is a side view of a preferred embodiment of a probe.

In the embodiment illustrated in FIG. 2, the probe 19 has a probe tube portion 10 that extends beyond the housing 36 of the moving system (such as a compressor) and into close proximity with the lip 32a. The probe 19 can detect axial shaft movement in either direction when the probe is positioned within a groove, since a second lip 32b will be provided. In system with an annular groove, the probe tube portion 10 extends with clearance into the annular grove. If the shaft moves axially due to wear of a bearing or any other reason, the lip 32a or 32b will contact the probe tube portion 10 of the probe 19. Other embodiments of the invention may include a probe that does not have a tube portion, rather some other portion of the probe is positioned near a surface or lip associated with a rotating part where out of tolerance movement will result in contact with a portion of the probe. As explained below, this contact will lead to an activation of the sensor.

Figure 1A:
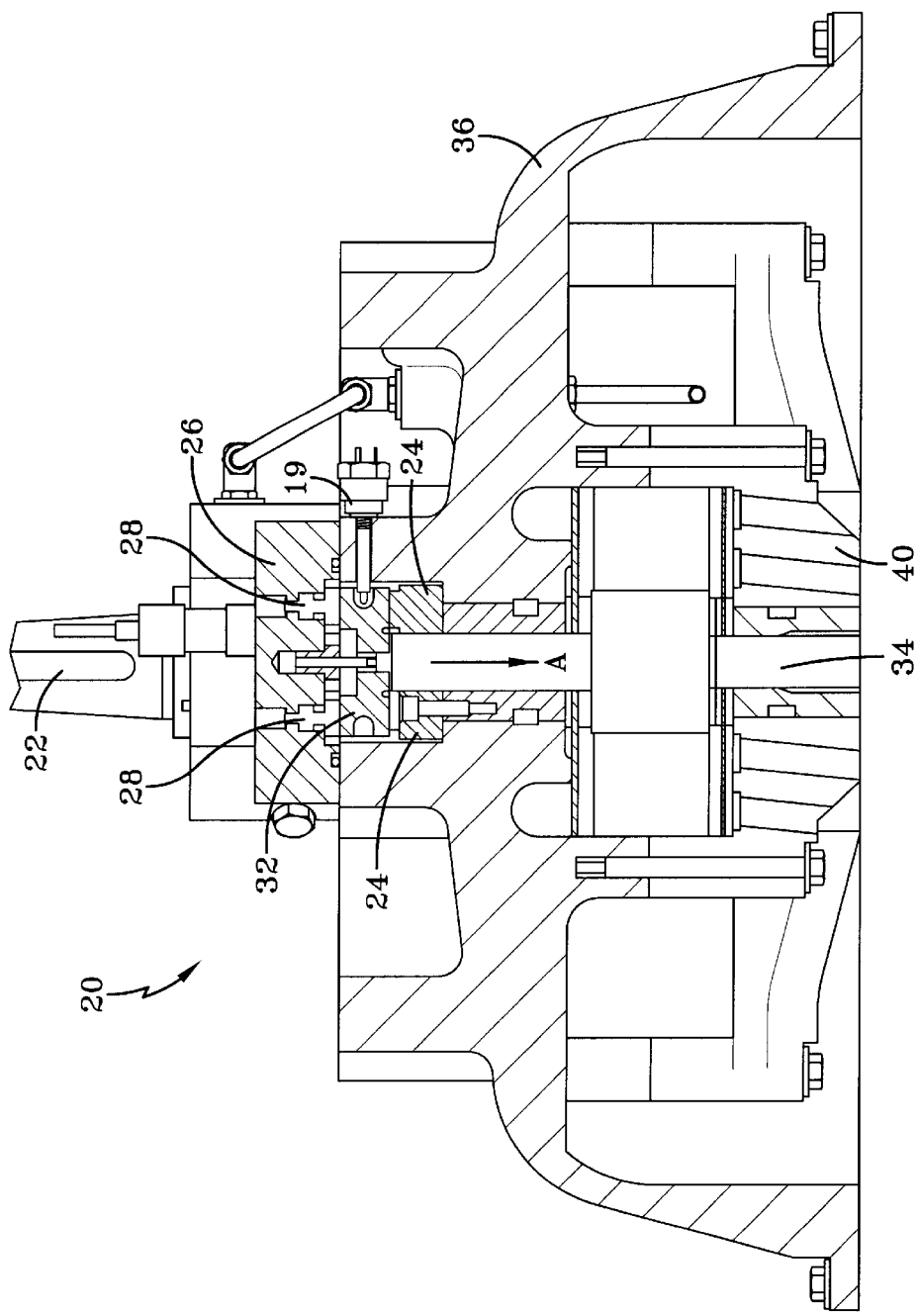
FIG. 1a fragmentary cross-section of a centrifugal compressor showing the location of a position limit sensor.
Figure 1B:
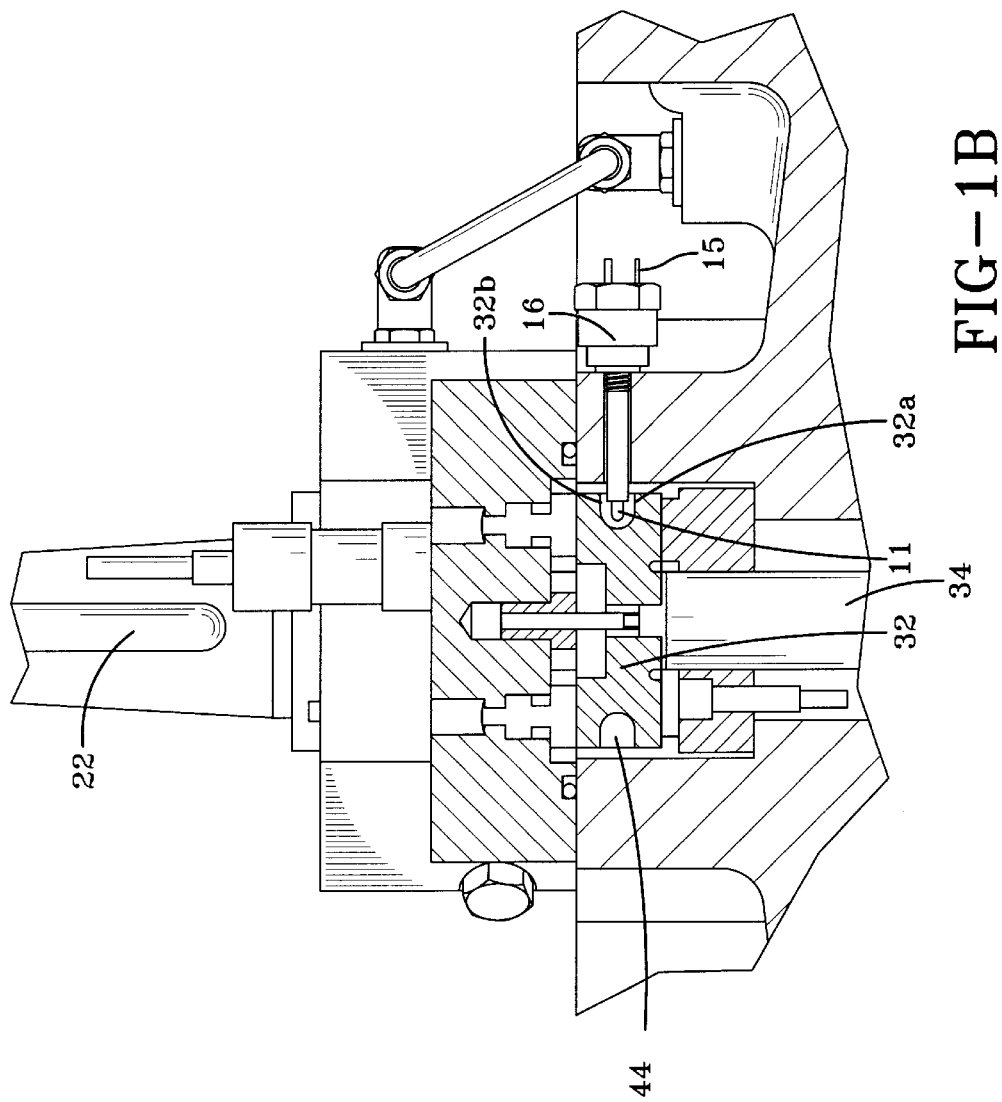
FIG. 1b is a fragmentary cross of centrifugal compressor showing the location of position limit sensor and a preferred position limit sensor.

Reference will now be made in detail to the present preferred embodiment of the invention, an example of which is illustrated in the accompanying drawings. An embodiment of the invention includes a position limit sensor as in FIGS. 1a, 1b, and 2 and designated generally by the reference number 19. In FIGS. 1a and 1b the probe tube assembly 19 is incorporated in a compressor 20 of a refrigeration system. The compressor shown in FIG. 1a includes a keyed tapered shaft 22 that is driven by a motor (not shown). The keyed tapered shaft 22 is mechanically connected via gears 38 to a high speed shaft 34. Connected to the high speed shaft 34 is an impeller 40.

Rotation of impeller 40 compresses the refrigerant in the compressor 20. The act of compressing the refrigerant creates an axial reactionary force or thrust in the direction of the arrow A in FIG. 1a. To restrain the axial force or thrust, the high speed shaft 34 is capped with a thrust collar 32. While the compressor is operating, the thrust collar 32 spins against a stationary forward thrust bearing 24 and a stationary reverse thrust bearing 26. Contact between the thrust collar 32 and the thrust bearings 24 and 26 is via an oil film between thrust pads 28 in the thrust bearings 24 and 26 and the thrust collar 32. Occasional irregularities in the operation of the compressor such as a surge, will cause a reverse in the thrust direction. As such times the forward thrust bearing 24 will act as a reverse thrust bearing and the reverse thrust bearing 26 will act as a forward thrust bearing. In the embodiment shown in FIGS. 1a and 1b, the probe 19, will detect movement of the thrust collar 32 in either axial direction. If the thrust collar 32 moves in the direction shown by arrow A, the lip 32b will contact the probe. If the thrust collar 32 moves in the direction opposite of arrow A, lip 32a will contact the probe. The thrust collar 32 is immersed in a highly pressurized lubricating oil. High pressure lubrication oil is pumped into the area of the thrust collar 32 at higher than system pressure. The lubricating oil is kept at a higher than system pressure to assure that proper oil flow volume and oil flow direction are maintained. The pressure in the area surrounding the thrust collar 32 is significantly greater than atmospheric pressure.

In FIG. 2, the position limit sensor is shown to include a hollow probe tube 10 having a constant inside diameter throughout the length of the tube. The outside diameter of the tube is also constant up to a smaller diameter tip portion 11. The reduced outside diameter of the tip portion results in the tip portion 11 having a thin wall section in relation to the wall section of the rest of the tube 10. An interior pressure chamber 14 is defined by a base portion 16 from which the tube 10 extends and is in fluid communication with the hollow portion of the tube 10. A pressure sensor 12, having leads 18 extending to an electrical connector 15 for electrically connecting the pressure sensor to an apparatus for detecting a signal or a change in signal indicating a change in pressure in the probe tube 10, and an electrical connection 17 to ground. The base position 16 includes external wrench flats 13 to facilitate installation and removal of the tube 10 by external threads 25 cooperable with internal threads in the compressor 20. The pressure sensor 12 attaches to the probe via threads 21 which engage with threads 23 in the interior of the base portion 16. The probe tube 10 is a closed, hollow tube made of a material that resists bending and will break or wear when contacted with moving parts, so that fluid (gas or liquid) adjacent the tube will flow into the interior of the tube. The smaller diameter tip portion 11 is the portion of the probe tube that fits into the thrust collar groove 44. The reduced thickness of the smaller diameter tip 11 provides increased sensitivity because the lip 32a or 32b will not have to break or wear through a lot of material before breaching the probe tube 10.

The position limit sensor 19 is fixed to the compressor housing 36 by the threads 25. When so fixed, the tip 11 of the sensor is located in a groove 44 in the thrust collar 32. As the high speed shaft 34 turns the impeller 40, the thrust collar 32 is pressed against the thrust bearing 24 in the direction of the arrow A in FIG. 1a. As the thrust bearing 24 and thrust pads 28 wear, shaft assembly, including the high speed shaft 34, the impeller 40, and the thrust collar 32, will move in the direction of the arrow A in FIG. 1a. One purpose of the probe tube 19 of the present invention is to detect when a thrust bearing or another component has worn beyond an acceptable level. The pressure sensor is positioned within the pressure chamber, in a sealed relationship with the main body. In one embodiment, the probe tube, main body, and pressure chamber are all machined as a single integral unit.

Figure 4A:
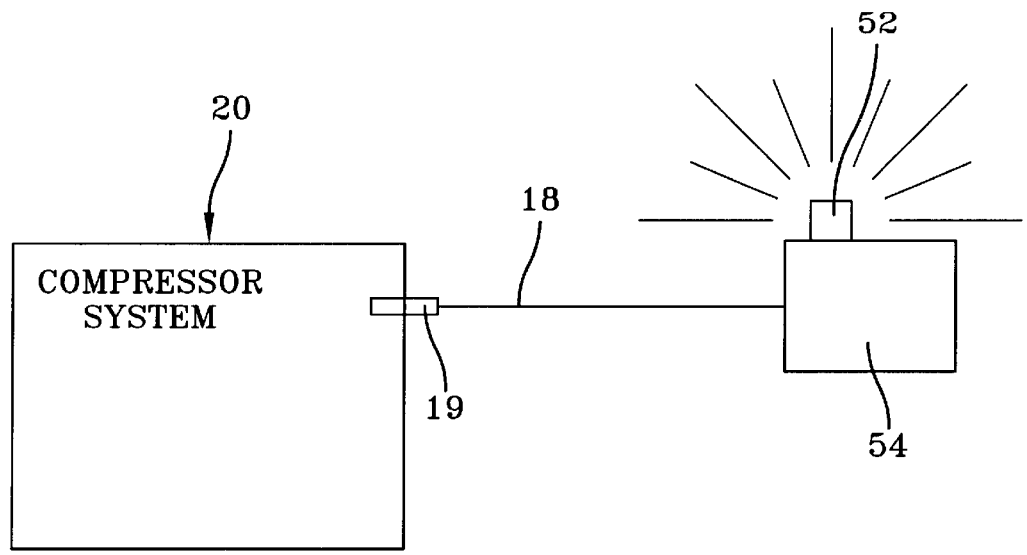
FIG. 4a is a schematic diagram of a position limit sensor connected to a warning or indication device for a system operator.
Figure 4B:
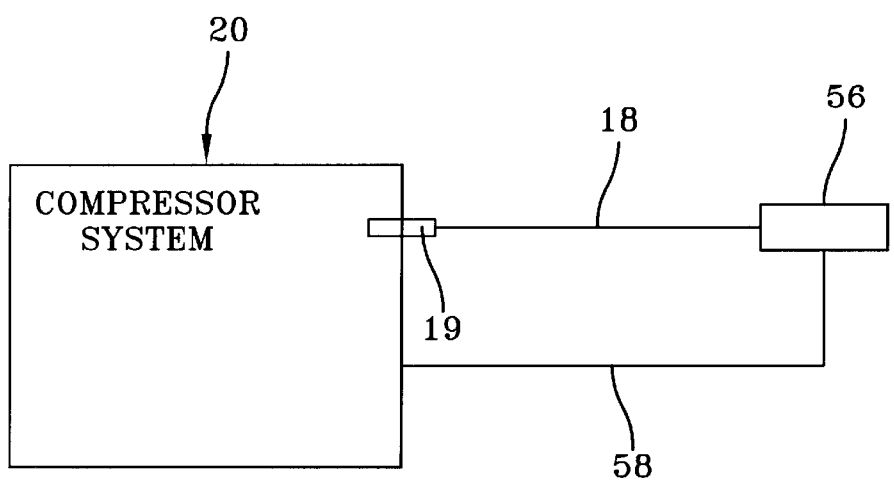
FIG. 4b is a schematic diagram of a position limit sensor connected to a system controller configured to control the system.

As the thrust bearing 24 and thrust pads 28 continue to wear, the lip of the thrust collar 32b will contact the probe tube 10 until it wears a hole in or breaks the probe tube 10. Once the probe tube 10 is breached, the high pressure oil will flow into the interior of the probe tube 10. The high pressure will be detected by the pressure sensor 12. As shown in FIGS. 4a and 4b, the sensor 12 in turn is connected to a system control 56 or to a warning device 52; to indicate that the compressor needs to be shut down and inspected or repaired.

The clearance between the probe tube 10 and the lip 32b of the thrust collar is set at a predetermined distance to permit some wear of the thrust bearing 24 and thrust pads 28 before contact and breach of the probe tube 10. Once the thrust collar moves beyond a predetermined clearance, the collar will contact the probe tube 10. The breach point of the probe tube is located so that the probe tube 10 is breached by the lip 32b of the thrust collar 32 before the clearance tolerances for the other moving parts such as the gears 38 and impeller 40 are violated.

As shown in FIGS. 4a and 4b, the position limit sensor 19 is connected to a device 54 or 56 that will interpret a signal or change in signal which indicates the probe tube 10 as been breached FIG. 4a shows a warning device 52 which will indicate a warning by displaying a light, sounding an alarm, displaying a voltage, or otherwise indicate a signal from the probe 19. In FIG. 4b a position limit sensor 19 is connected to a system control 56. A connection 58 connects the system control to the system 20. When the system control 56 receives a signal or change in signal indicating a breached probe tube 10, the system control 56 or system operator will have notice that the probe tube 10 has been breached, and the control 56 or operator will shut down the system. The position limit sensor 19 and the thrust bearings 24 and/or 26 can then be replaced, if necessary.

In one preferred embodiment of the invention, the probe tube 10 is made of brass and the fluid that will flow into a breached probe tube is lubrication oil. The fluid that flows into the breached probe tube can also be a mixture of lubrication oil and refrigerant or some other fluid. The probe tube 10 acts as a pressure vessel in that its interior pressure is different than the surrounding pressure inside the compressor or other system of moving parts, until its tip 11, or another portion, is opened by contact with a moving part. As the moving parts of the system strike the probe tube, it will break or wear a hole at the point of contact. The break or hole will allow fluid to flow into the interior of the tube, and the pressure within the probe tube will quickly equalize with the surrounding pressure.

To enhance the pressure differential between the interior of the housing 36 and the probe tube 10, the probe tube 10 is evacuated to near or to a vacuum, and thus contains little air or gas. One way this may be achieved is to assemble the probe tube 10 and pressure sensor 12 in a vacuumed environment. The lack of air or gas within the probe tube 10 provides benefits. First, the vacuum or low pressure tends to decrease the response time of the device, since there is little or no pressure or air to block flow of fluid into the interior of the probe 10 and to the sensor. Second, the absence of air in the tube before breakage reduces any pressure change within the probe tube that can be caused by a change in temperature surrounding the probe. This reduces the possibility of detecting a pressure change caused by temperature variations outside the probe and misconstruing the change to indicate a breached probe tube.

The pressure sensor 12 may be analog or an on/off type sensor. When an analog type of pressure sensor 12 is used, it is attached in a sealed relationship to the probe tube 10 and emits a voltage corresponding to the pressure within the probe tube 10. When the pressure within the probe tube 10 changes, the pressure sensor 12 will emit a different voltage to reflect the new pressure. Sudden changes in the interior pressure of the probe tube 10 will cause the pressure sensor 12 to make sudden changes in the voltage it emits.

As shown in FIG. 2 an electrical connection apparatus 15 provides a means for the pressure sensor 12 to connect to a simple output device, 52 or to a control 56. The output device 52 could be a voltage indicator. The voltage indicator 52 will indicate a change in pressure within the probe tube 10 by indicating the change in voltage output from the pressure senor 12 in an analog type pressure sensor. An operator can visually observe the change in voltage, or the change can be used to drive other devices, such as audio or visual warning devices. The sensor can also be connected to a switch or a computer control 56.

In a preferred embodiment of the invention, the pressure sensor 12 is an on/off diaphragm switch. The pressure sensor pushes on a micro switch at a predetermined pressure, preferably about 25 psi. One example of a preferred pressure switch is a Texas Instruments Type 20PS or equal. The preferred pressure switch is configured so if it fails, it trips the micro switch. With a preferred on/off type pressure sensor, the sensor may be electrically connected to the compressor controller 56 so that the compressor or machine will shut down when the switch is tripped. Thus, the switch is tripped, and the compressor shuts down, if the probe tube is breached or the switch becomes defective. If the problem is merely a defective switch, the switch can easily be replaced.

In the preferred embodiment, the probe tube base position 16 is fixed to the compressor in a sealed manner. Therefore, if the pressure sensor 12 fails, the sensor 12 may be removed and replaced without removing the system refrigerant and equalizing pressures of the system with the ambient conditions.

The rating of the pressure sensor 12 may be coordinated with the pressure of the system, so that minor changes in pressure within the probe tube 10 due to temperature changes or the like do not activate the micro switch in the pressure sensor. The pressure sensor 12 is preferably selected so that it detects the change in pressure within the probe tube 10 when the probe tube 10 is breached by moving parts in the system and the interior of the probe tube 10 equalizes with the system pressure. In a compressor application, the change in pressure between the interior of the probe tube and the outside system pressure is on the order of 100 psi, or more.

Figure 5A:
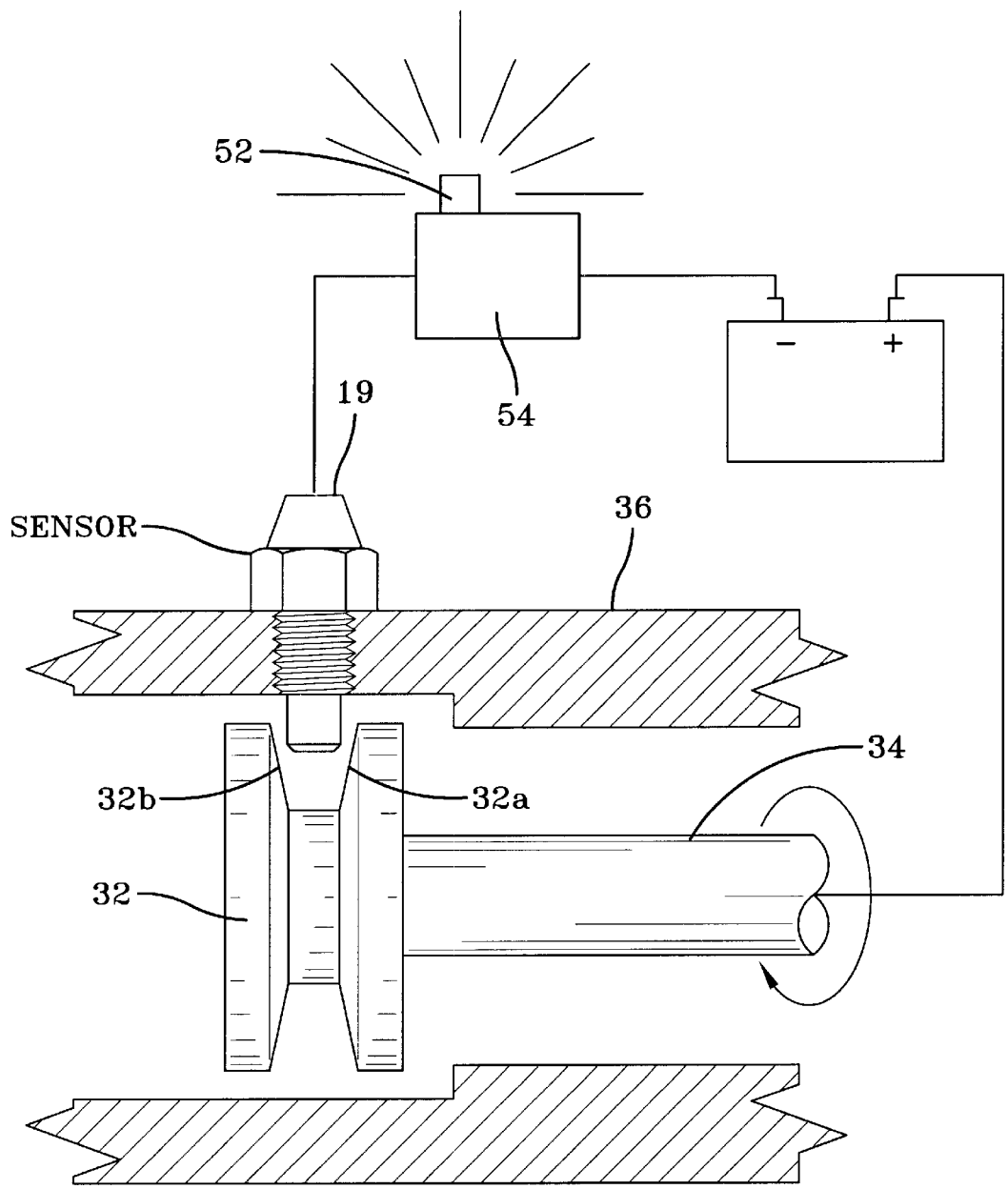
FIG. 5a is a schematic diagram of a sensor that completes an electric circuit and activates a warning or indication device when it contacts a moving part.
Figure 5B:
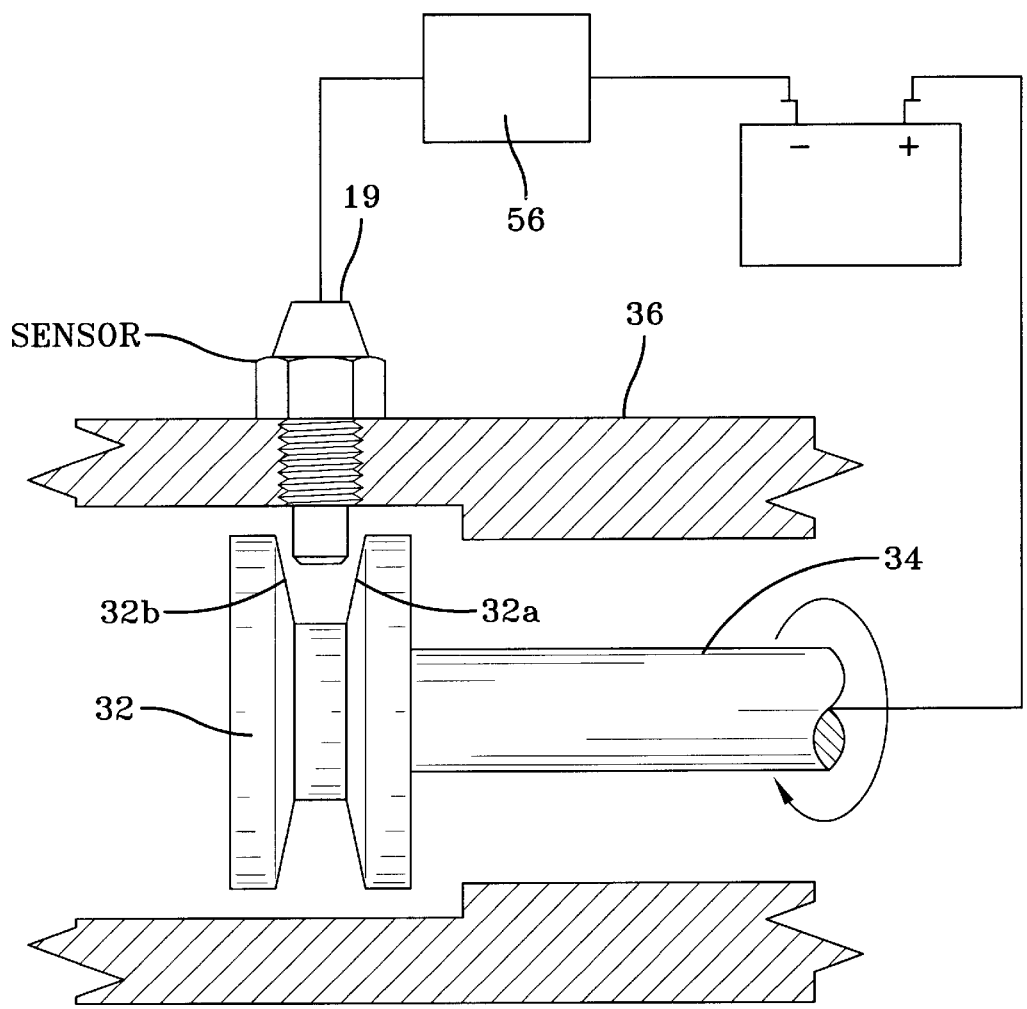
FIG. 5b is a schematic diagram of a sensor that completes an electric circuit which is input into a system controller when it contacts a moving part.
Figure 6:
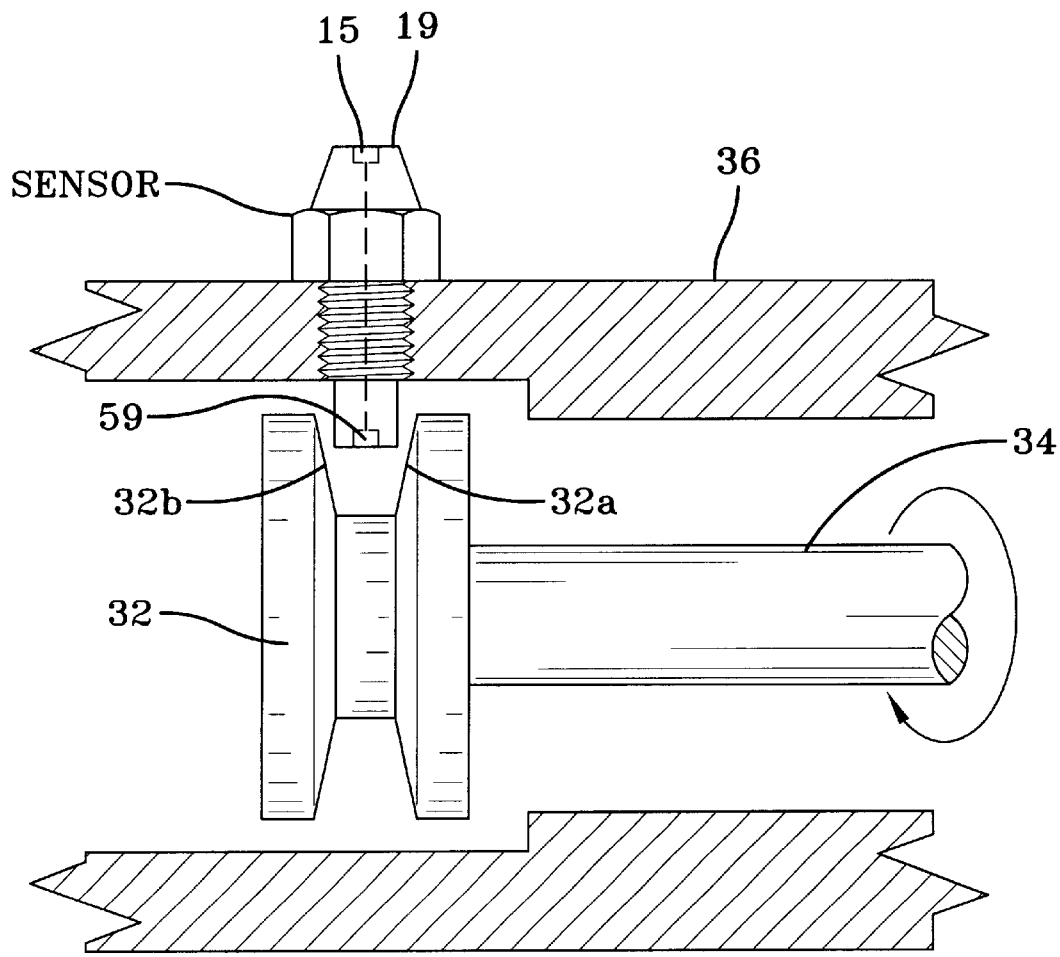
FIG. 6 is a schematic diagram of a sensor with a thermistor for detecting heat caused by friction between the probe and a moving part.
Figure 7:
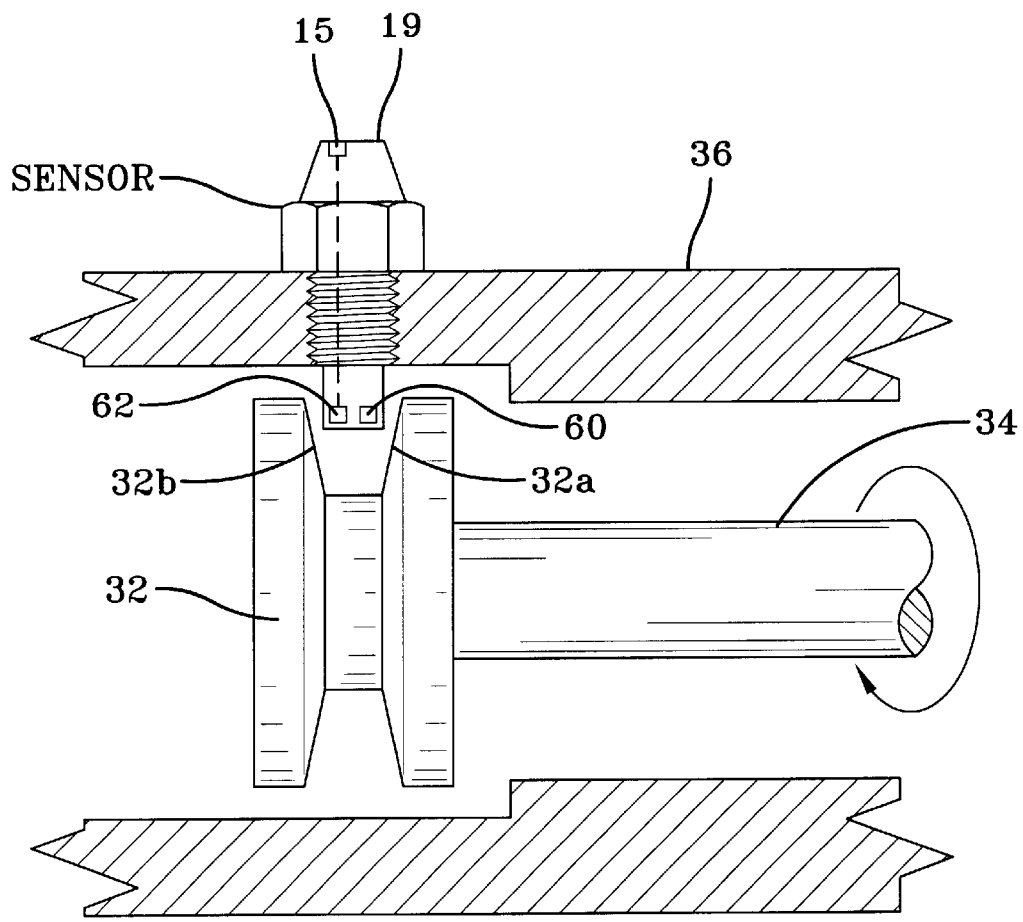
FIG. 7 is a schematic diagram of a sensor that has a portion of the sensor generate an electromagnetic field and another portion detect disturbances in the field due to the proximity of a moving part.
Figure 8:
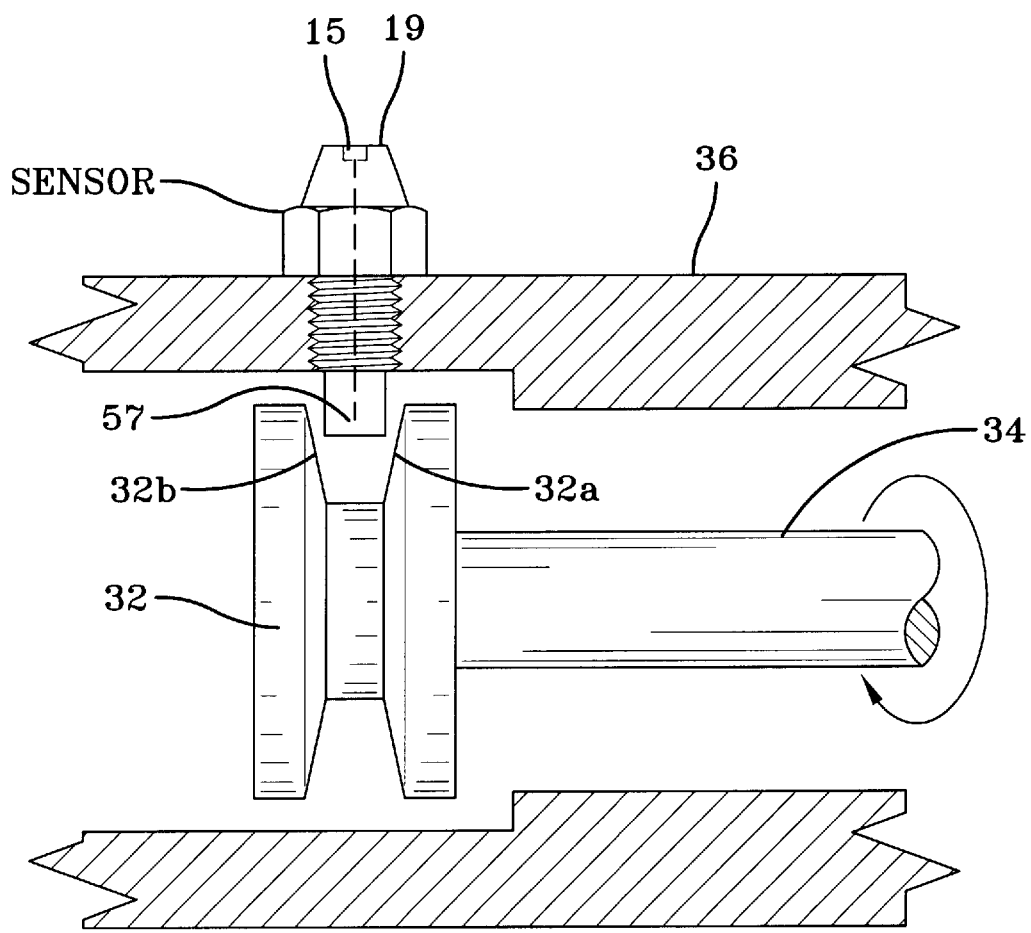
FIG. 8 is a schematic diagram of a sensor with a strain gage for detecting strain associated with the sensor contacting a moving part.

In other embodiments, the probe of the present invention can detect movement of the shaft through contact in several ways. One way is for the lip to complete a circuit with the probe when the two contact each other as shown in FIGS. 5a and 5b. Both the lip and the probe would have to be part of an electrical circuit. Another way to detect the contact is to place a thermistor 59 in the end of the probe tube 10 as shown in FIG. 6. When the two touch, the friction created between the rotating lip 32a or 32b will create heat detectable by the thermistor. In addition, the probe tube 10 could use magnetic or electric fields to detect the proximity of the lips 32a or 32b as shown in FIG. 7. The probe could also include a strain gage as shown in FIG. 8 that would sense the touch of the lip 32a or 32b at a predetermined point. The probe tube 10 could also separate a fluid, from the interior of the tube. When the probe tube 10 is struck by the lip 32a or 32b, the probe tube 10 could break or wear and expose the interior of the probe tube 10 to a fluid. Each of these methods for detecting lip contact with the probe tube 10 will be discussed in turn.

Using the contact between the lip 32a or 32b to complete a circuit will involve several considerations. One is ensuring that probe 19 and the portion of the shaft will form an electrical circuit. One way to accomplish this is to insulate the probe 19 from the system housing, and connect the lip 32a and/or 32b to ground. The probe 19 could be electrically connected to a power source, so that when the probe contacts the lip 32a or 32b, the circuit would be closed as shown in FIGS. 5a and 5b. The circuit could operate a warning light or sound as shown in FIG. 5a or could be incorporated into a system controller as shown in 5b, so the controller will shut down the system when contact is made. If the shaft 34 and the sensor 19 are in a fluid environment, for example, lubricating oil, refrigerant or some other fluid, care should be taken to ensure the fluid is not conductive. Otherwise the fluid would complete the circuit and result in a false reading of contact between the sensor 19 and the lip 32a or 32b. If the fluid used in the system was only partially conductive, the circuit could be designed to detect a change in resistance. Current flowing through the fluid between the probe tube 10 and the moving part 32 near the probe tube 10, would exhibit a certain amount of resistance. When the probe tube 10 contacts a lip 32a or 32b, a short will be created and the system will display a detectable reduced resistance signal. This change, could be used to trip a warning or system shutdown.

Another way to detect contact between the probe tube 10 and the lip 32a or 32b to install a thermistor 59 in the probe tube 10 as shown in FIG. 6. When there is no contact between the lip 32a or 32b and the probe tube 10, the thermistor 59 will register a reading of the temperature of the environment where the probe tube is located. In a preferred use of the invention, the probe tube 10 is used in a compressor for a refrigeration system immersed in lubricating oil at about 120° F. When the lip 32a or 32b contacts the probe tube 10, friction between the rotating lip and the stationary probe will result in heat. This heat would be detected by the thermistor 59 which will generate either an on/off or analog signal which will result in a warning to a system operator or a shutdown signal to the system controller 56 as shown in FIGS. 4a and 4b.

In a system were actual contact between the probe tube and the moving parts are not desirable, the probe tube 10 could use magnetic or electric fields to detect the proximity of the lips 32a or 32b. As shown in FIG. 7, as the lips 32a or 32b near the probe tube 10, the metal lip will disturb the magnetic or electric field generated by an electromagnetic field generating device 60 in the probe. The disturbance will be detected by a detection device 62 in the probe 19 and a signal will be sent to warn the system operator or be an input to the system controller as shown in FIGS. 4a and 4b. This technique is similar to eddy current axial sensors already in the market used for monitoring axial movement for a shaft, but the sensors would be adapted to be oriented in a position near a lip or surface associated with the rotation shaft.

Another way the probe could detect contact with the moving parts is through a strain gage 57. As shown in FIG. 8, the probe could be configured to have a strain gage 57 in the end portion of the probe tip. As the lip 32a or 32b moves and contacts the strain gage, the strain gage 57 will detect a strain associated with the lip 32a or 32b pressing against the probe tip. One advantage of this type of system is that the amount of strain detected may be interpreted to determine the axial position of the shaft. The sensor including the strain gage 57 will then generate a signal that will activate a warning or shut down the system as shown in FIGS. 4a and 4b.

In a system where the rotating parts are immersed in a fluid such as a lubricant, refrigerant or the like, the probe tube 10 could separate the fluid, from the hollow interior of the tube. When the probe tube 10 is contacted by the lip 32a or 32b the probe tube 10 could break or wear and expose the interior of the probe tube 10 to a fluid. The fluid would enter the interior of the tube and trip a sensor configured to detect the presence of a fluid. The tripped sensor will generate a signal which will warn a system operator via a warning light or sound or the signal could be sent to the system controller and cause the system to shut down as shown in FIGS. 4a and 4b.

Using several probes in a staged manner will provide an advance warning of a part violating its clearance tolerances. Using a system of several probes as shown in FIGS. 9a and 9b a system operator may be able to track the movement of a rotating part. This type of system of probes involves several probes installed in one of the manners described above. As shown in FIGS. 9a and 9b a first probe 19a having a small tolerance between the probe tube 10a and the lip 32a or 32b, and a second probe 19b is installed with a larger tolerance than the first probe 19a so that as the part moves it will trip the probes one by one. As the probes are tripped, the probes will generate and send a signal to the system operator or the system controller, informing the operator or control which probes are tripped as shown in FIGS. 5a and 5b. This will inform the system operator where the part is and if the time between probe trips is timed, it will inform the system operator how fast the part is wearing or moving. This will give the system operator a chance to correct the problem parts at a convenient time. As many probes may be used as desired to track part tolerance. The final probe will generate a signal to shut down the system when it is tripped to prevent the clearance tolerances to be violated as shown in FIG. 5b.

The probe described above could also be used to detect non-axial movement of a rotating shaft such as wobble with or without the need of a lip. A shaft that is eccentrically rotating and moves out of a clearance between the bottom surface of a probe tube 10 and the surface of the shaft would contact the probe. This contact can be detected in a manner as already described.

Another aspect of the invention a method of detecting the movement of a part in a system or device including: positioning a probe adjacent to but spaced from a surface of the moving part; providing a sensor in association with the probe; and generating a signal from the sensor when the probe and the moving part contact each other.

The method may also include warning a system operator when the signal or change in signal is generated. As shown in FIG. 4a and previously described, the probe 19 is connected to a warning device 52 to alert a system operator.

The method may also include shutting down a system operating the rotatable part in response to the signal or change in signal is generated. As shown in FIG. 4b and previously described, the probe 19 is connected to a system control to shutdown the system when a change in pressure on the interior of the probe tube 10 is detected.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A position sensor to detect when a part in a pressurized space has worn beyond a preselected clearance comprising:
    a probe tube having an internal cavity, at least a portion of the outer surface of the probe being positioned in the pressurized space and proximate to but spaced from the part, when the part has not worn beyond the preselected clearance;
    a pressure sensor in fluid communication with the interior cavity of the probe to detect the pressure within the cavity; and an apparatus for permitting the position sensor to communicate with a device to indicate when the sensed pressure changes beyond a predetermined amount, indicating that the part has moved beyond a preselected clearance;

whereby, when the part wears beyond its preselected clearance, it engages at least a portion of the probe, breaches the probe, and permits pressurized fluid to enter the internal cavity of the probe and activate the sensor.

2. The position sensor of claim 1, wherein the probe tube is resistant to bending and will break or wear through when contacted by the moving part.

3. The position sensor of claim 1, wherein the probe tube is fixed to a system housing in a sealed relationship and the pressure sensor may be replaced without removing the probe from the system.

4. The position sensor of claim 1, wherein the pressure sensor may be removed from the probe tube and replaced.

5. The position sensor of claim 1, wherein the interior cavity of probe tube is evacuated to a pressure below atmospheric pressure.

6. The position sensor of claim 1, wherein the pressure sensor rating of the pressure sensor is coordinated with a system pressure.

7. The position sensor of claim 1, wherein the probe tube is made of brass.

8. The position sensor of claim 1, wherein the pressure sensor is an on/off sensor.

9. The position sensor of claim 1, wherein an outer diameter of the probe tube is thinner at an end region and a diameter of the internal cavity is substantially constant through the length of the internal cavity.

10. The position sensor of claim 1, wherein the position sensor includes wrench flats.

11. A compressor system comprising:

a rotating shaft with a thrust bearing;

a part associated with the thrust bearing and subjected to high fluid pressure;

a housing for containing the rotating shaft and a high pressure fluid;

a probe tube having an internal cavity, at least a portion of the outer surface of the probe being positioned proximate to but spaced from the part when the thrust bearing has not worn beyond a preselected clearance;

a pressure sensor in fluid communication with the interior cavity of the probe to detect the pressure within the cavity; and a device in communication with said sensor to indicate when the sensed pressure changes beyond a predetermined amount, indicating that the part has moved beyond a preselected clearance;

whereby when the thrust bearing wears beyond the preselected clearance, it engages at least a portion of the probe, breaches the probe, and permits pressurized fluid to enter the internal cavity of the probe and activate the pressure sensor.

12. The position sensor of claim 11, wherein the probe tube is resistant to bending and will break or wear through when contacted by moving parts.

13. The position sensor of claim 11, wherein the probe tube is fixed to the compressor in a sealed relationship and the pressure sensor may be replaced without removing the probe from the compressor.

14. The position sensor of claim 11, wherein the pressure sensor may be removed from the probe tube and replaced.

15. The position sensor of claim 11, wherein the interior cavity of probe tube is evacuated to a pressure below atmospheric pressure.

16. The position sensor of claim 11, wherein the pressure sensor rating of the pressure sensor is coordinated with the working pressure of the compressor.

17. The position sensor of claim 11, wherein the probe tube is made of brass.

18. The position sensor of claim 11, wherein the pressure sensor is an on/off sensor.

19. The position sensor of claim 11, wherein the part associated with the thrust bearing is a 9 thrust collar.

20. The position sensor of claim 11, wherein an annular grove is formed in said part and a portion of the probe is positioned within the grove.

21. The position sensor of claim 11, wherein an outer diameter of the probe tube is thinner at an end region and a diameter of the internal cavity is constant substantially throughout the length of the internal cavity.

22. The position sensor of claim 11, wherein the position sensor includes wrench flats.

23. A method for detecting out clearance tolerance movement of a rotatable part in a pressurized enclosure comprising:

placing a hollow probe into a housing configured to contain pressurized fluid, the probe being placed in proximity to the rotatable part wherein when the rotatable part moves out of a predetermined clearance tolerance, the rotatable part will breach the hollow probe tube; and detecting an increased pressure in the hollow probe tube when the rotatable part breaches the hollow probe tube as a indication that the rotatable part has moved out of a predetermined clearance tolerance.

24. The method of claim 23, further comprising generating a signal or a change in signal when an increased pressure within the breached hollow probe tube is detected.

25. The method of claim 23, further comprising warning a system operator when the signal or change in signal is generated.

26. The method of claim 23, further comprising shutting down a system operating the rotatable part in response to the signal or change in signal.

* * * * *

UNITED STATES PATENT AND TRADEMARK OFFICE
CERTIFICATE OF CORRECTION

PATENT NO. : 6,657,217 B2
DATED : December 2, 2003
INVENTOR(S) : Mark A. Adams et al.

It is certified that error appears in the above-identified patent and that said Letters Patent is hereby corrected as shown below:

<u>Column 2,</u>
Line 6, "particularly a pointed out" should read -- particularly pointed out --.

Signed and Sealed this

Ninth Day of March, 2004

JON W. DUDAS
*Acting Director of the United States Patent and Trademark Office*